United States Patent [19]

Schmacher

[11] Patent Number: 5,058,361
[45] Date of Patent: Oct. 22, 1991

[54] PACKAGE END FOLD SEALER AND METHOD

[76] Inventor: Roland W. Schmacher, 2322 Henry Street, Sheboygan, Wis. 53081

[21] Appl. No.: 493,518

[22] Filed: Mar. 14, 1990

[51] Int. Cl.$^5$ .................. B65B 51/20; B65B 51/32
[52] U.S. Cl. .................. 53/370.9; 53/371.4; 53/387.3
[58] Field of Search ............ 53/228, 379, 388, 370.9, 53/371.2, 371.4, 372.3, 387.3; 493/141, 190, 191

[56] References Cited

U.S. PATENT DOCUMENTS

| | | | |
|---|---|---|---|
| 1,114,744 | 10/1914 | Friend | 53/388 |
| 1,655,639 | 1/1928 | Sevigne | 53/388 |
| 1,685,196 | 9/1928 | Bechman | 53/388 X |
| 2,354,989 | 8/1944 | Fusco | 53/388 |
| 3,057,125 | 10/1962 | Jensen | 53/379 X |
| 3,063,215 | 11/1962 | Parks | 53/388 |
| 3,243,334 | 3/1966 | Lake | 53/379 X |
| 3,264,799 | 8/1966 | Bartlo | 53/379 |
| 3,618,477 | 11/1971 | Piazze | 493/190 |
| 3,977,306 | 8/1976 | Flynn | 493/141 |

FOREIGN PATENT DOCUMENTS 901139  7/1962  United Kingdom .................. 53/379

Primary Examiner—John Sipos
Attorney, Agent, or Firm—Lathrop & Clark

[57] ABSTRACT

An apparatus for sealing the folded end flaps of a plastic film package is disclosed. The apparatus has means for transporting the package along a path and linear spaced end fold guides which are spaced from the path so as to retain the end flaps of the package folded against the package while traveling along the path from an overwrapping machine. Air heating and blowing means disperse heated air towards the folded end flaps of an article traveling along the path. Rotatable air-heated spot-weld rollers having a plurality of spaced protrusions are flexibly mounted adjacent to the path. The rollers are rotatably mounted and are adapted to be pressed against the end flaps of the package so the heated protrusions spot-weld the end flaps to one another. A hot air dispersing nozzle directs the heated air from the air heating and blowing means onto the spot-welded end flaps of the package causing portions of the end flaps to become molten. Cylindrical compression rollers which are formed with a series of uniform holes are maintained in spring-mounted relation to the path so as to press against and cool the semi-molten end folds of the package traveling along the path to bring about the sealing of the end flaps to one another.

12 Claims, 6 Drawing Sheets

PACKAGE END FOLD SEALER AND METHOD

FIELD OF THE INVENTION

The present invention relates to packaging apparatuses and methods and, more specifically, to an apparatus and method for sealing the folded end flaps of plastic film wrapped packages.

BACKGROUND OF THE INVENTION

Articles for retail display such as bathroom tissue, paper napkins, or household towel Products are commonly packaged in heat-sealed plastic film. Packaging utilizing a plastic film such as polyethylene is formed by wrapping the package in a sheet of plastic film and heat sealing the length-wise seam of the package. End folds are formed in the film and sealed to one another on both ends of the package to fully seal the package. Apparatus for performing this packaging operation must be able to rapidly process a great number of packages while at the same time maintaining the end fold shape and integrity to present a neat and clean store shelf appearance to consumers. Furthermore, the end folded film must be welded to itself but may not adhere to the packaged article.

A typical conventional end fold sealer receives packages from an overwrapping machine which have been wrapped in plastic film with the long girth seam heat-sealed, mechanical end folds formed, and the packages equally spaced and timed from one another. The conventional end fold sealer employs continuous, low stick sealing belts both for transporting the Packaged articles from the overwrapping machine and for heating and cooling the package to seal the end folds.

A drawback of the continuous sealing belts of the conventional end fold sealer is that the speed of the sealing belt travel must be greater than the overwrapping machine's speed of producing packages in order to take away the packages quickly enough to avoid damage by allowing the packages to accumulate or come in contact with the overhead grippers or pusher plates of the overwrapping machine. The higher speed of the sealing belts facilitates the package take away but requires extending the length of the conventional end fold sealing line with resultant higher costs.

The conventional package end fold sealer utilizes a series of individual heater blocks and long flat cooling plates adjacent the sealing belts to heat, seal and cool the package end folds. Each block must be individually maintained at its proper temperature by thermostatic controllers. Conventionally, 8 to 16 individual electrical heat controllers, along with 16 to 32 heater elements, will be needed. The sealing belts take away the packages from the overwrapper and maintain the end folds of the package adjacent to the package. While the belts transport the package, they first move over the faces of the heating blocks and transfer heat to the packages to form end seals, next the sealing belts move over the cooling plates to cool the formed end seals. At the end of the conventional package end fold sealer the belts release the package and continue the cycle. However, because the same part of the belt is in constant contact with the package end fold througout the sealing process there is a danger that the plastic film will stick to the belt when it releases the package, causing damage to the end fold.

To maintain the effective release of the moving sealing belts it is necessary to frequently coat the belts with a silicone release agent, either by spray atomization or brush. As dust and grime build up on the heater blocks, the heat transfer through the sealing belts is reduced, with resultant defectively sealed packages. Wear on the heater elements, thermostats, and belts results in frequent downtime for replacement.

Although heat transfer may be improved by increasing the pressure of the belts on the package ends, the stiff cardboard tubes on which most paper products are wound causes increased belt wear as the pressure is increased.

Heated air has been used for sealing the length seams of polyethylene packages where only two layers of plastic overlap. Hot air alone, however, cannot properly seal the package end fold, as the plastic shrinks away from the heat resulting in a separation of the top flaps of a mechanical end fold from the lower flaps.

What is needed is a package end fold sealer that can produce properly formed end fold seals at a high rate of speed without the need for heated moving belts and heating blocks which is thus easier to maintain and operate.

SUMMARY OF THE INVENTION

In accordance with the present invention, the apparatus for sealing the folded end flaps of a plastic film package of this invention has a means for transporting the package along a path and also has air heating and blowing means. The apparatus has a spot-weld roller which is an air-heated rotatable cylinder which has a plurality of spaced protrusions for heating and sealing limited areas of the plastic flaps. The spot-weld roller is maintained in spring-loaded relation to the path so that the rollers will press against the end folds of a moving package and spot-weld the end fold flaps to one another. The apparatus has means for directing the heated air from the air heating and blowing means onto the spot-welded end folds of the package traveling along the path to cause portions of the end flaps to become molten. The air directing means is located along the path subsequent to the spot-weld roller. A cylindrical compression roller is maintained in spring-mounted relation to the path subsequent to the air directing means and is adapted to press against and cool the molten end flap portions of the package traveling along the path to bring about the sealing of the end flaps to one another. The method for end sealing packages with formed end folds having a plurality of overlapping flaps of this invention comprises the steps of transporting packages overwrapped in plastic film with the film sealed lengthwise and with end folds formed along a path, heating a roller with a plurality of protrusions and impressing the roller against the moving end folds of the package to spot-weld one end flap to another, blowing heated air onto the spot-welded end folds to produce molten portions of plastic, and pressing unheated compression rollers against the molten end flaps to cool the plastic to form sealed end flaps.

It is an object of the present invention to provide an apparatus for sealing package end folds which can seal a package which is of uneven length.

It is a further object of the present invention to provide an apparatus for effectively sealing package end folds at a high rate of speed.

It is also an object of the present invention to provide a process for heat sealing package end folds which is reliable and requires reduced downtime.

It is another object of the present invention to provide an apparatus for sealing package end folds which does not employ heated belts and is easy to service and repair.

It is yet another object of the present invention to provide an apparatus for producing sealed package end folds which are uniform in appearance and fully sealed.

Further objects, features, and advantages of the invention will be apparent from the following detailed description when taken in conjunction with the accompanying drawings.

DESCRIPTION OF THE PREFERRED EMBODIMENT

Figure 1:
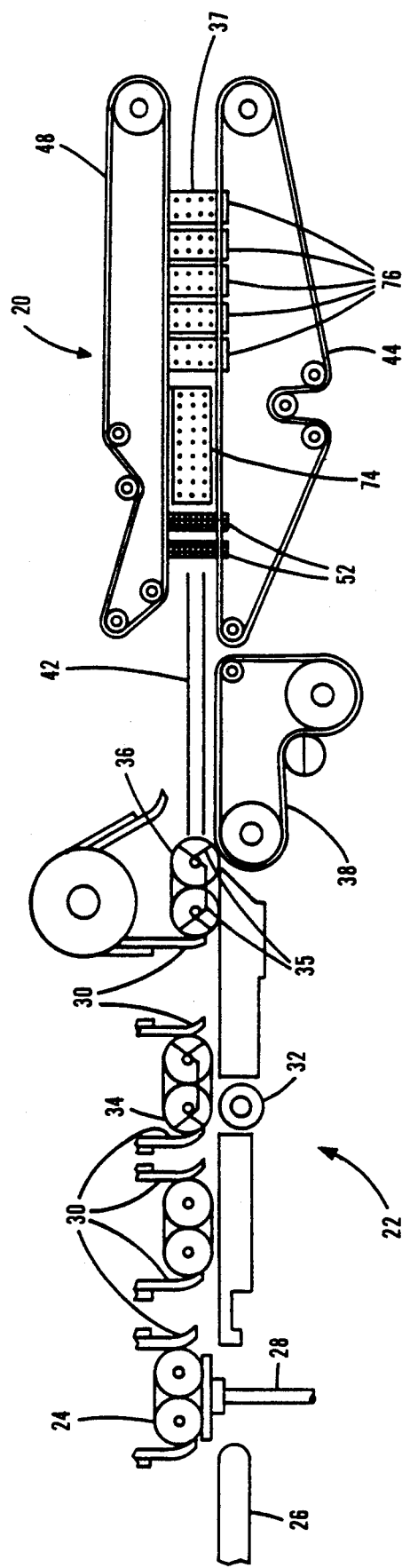
FIG. 1 is a schematic view of a typical conventional overwrapping machine supplying overwrapped packages with formed end folds to the package end fold sealer of this invention.

Referring now to FIGS. 1-7 wherein like numbers refer to similar parts, the package end sealer 20 of this invention is shown in FIG. 1 in its relation to a typical conventional package overwrapper 22. Typically, the package end fold sealer 20 will be mounted on the frame 23 of the conventional overwrapper 22 which extends outwardly from the overwrapper 22. The conventional overwrapper wraps an article 24 such as a single or multiple roll package of household towels, in a thin plastic film such as 1-1½ mil (25-38 microns) polyethylene. The article 24 travels through the underfolders 26 and the elevator 28 where it is wrapped with plastic film to form a package 36 and gripped by the overhead grippers 30 which present the long girth seam 31 (shown in FIG. 2.) of the package to the bottom sealer 32 which seals the package 36 lengthwise. The overwrapper 22 forms mechanical end folds 34 on both ends of the package 36. The mechanical or progressive endlock end folds 34 conventionally comprise four flaps 35 folded one over another to meet in the center of the package end. To properly seal this end fold it is essential that all four flaps 35 be welded together. If only the outermost flaps are welded an unacceptable seal will result and the package will have to be discarded. At the end of the overwrapper 22 the overhead grippers 30 rotate upwards and release the package 36 onto the transition belt 38 of the package end sealer 20.

Figure 2:
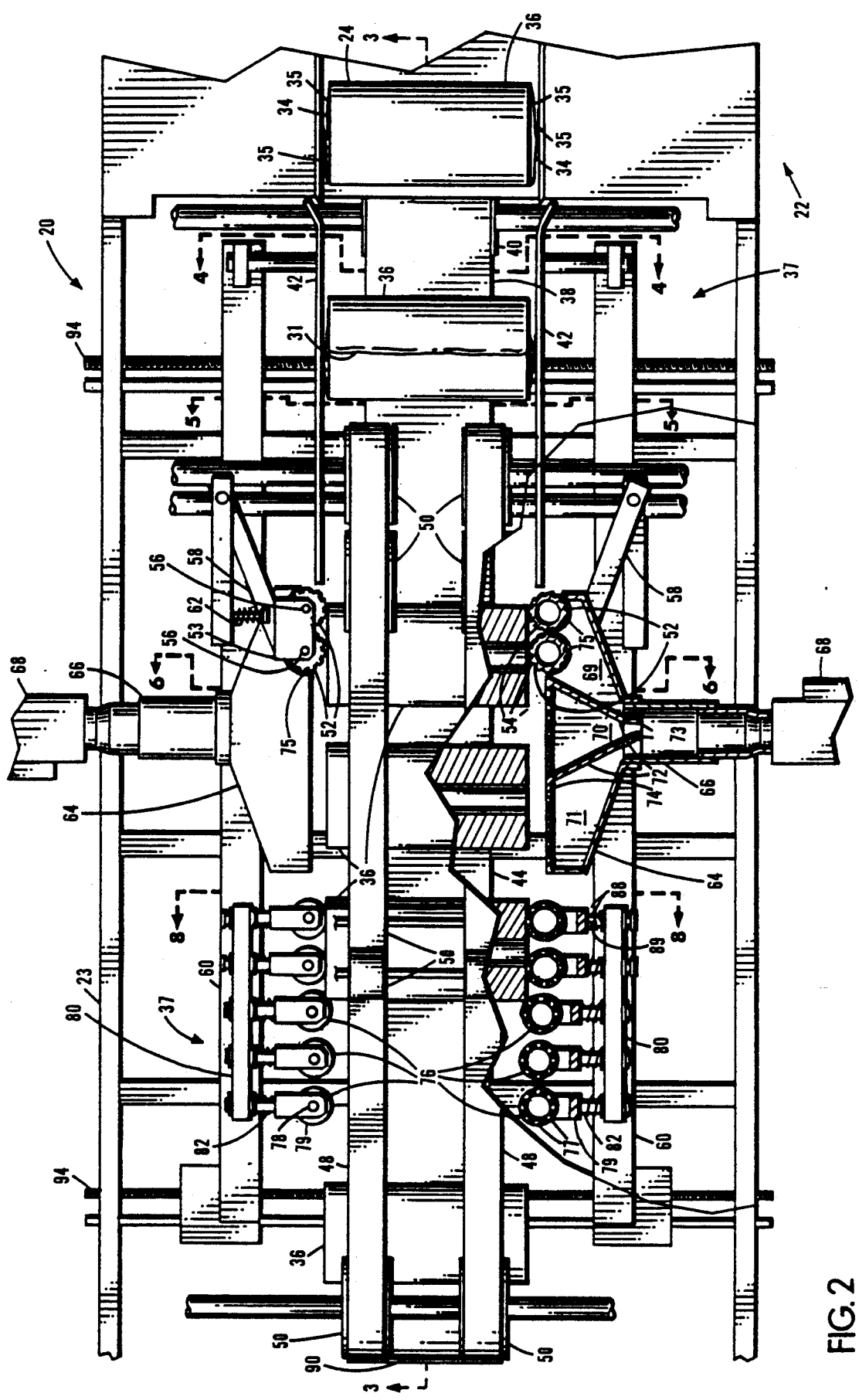
FIG. 2 is a top plan view partially broken away in section of the package end fold sealer of this invention with certain conventional support structure omitted for clarity.
Figure 3:
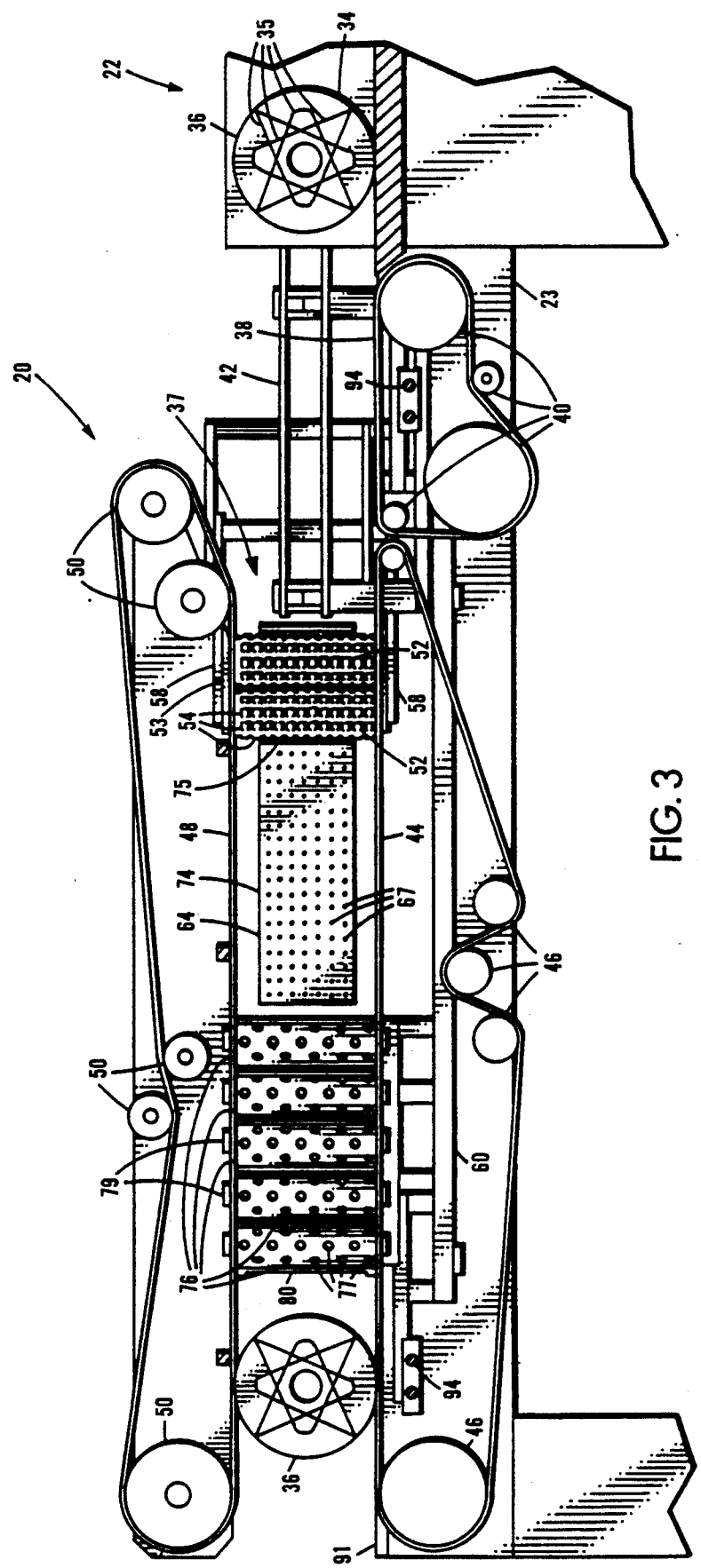
FIG. 3 is a cross sectional view of the package end fold sealer of FIG. 2 taken along section line 2—2 with intermediate packages removed for clarity, with the packages shown unsectioned.

The transition belt 38, as best shown in FIG. 3, is moved by a series of transition belt pulleys 40 at a speed greater than the speed of the package 36 through the overwrapper 22. In normal operation, articles will be wrapped in the overwrapper at the rate of 40-250 per minute, the transition belt must move faster than the rate of package flow through the overwrapper in order to avoid contact with the upwardly moving grippers 30 which would damage the package 36. The end fold sealer 20, best shown in FIGS. 2 and 3, has a series of belts which transport the package 36 along a generally straight path between two sets of sealing apparatus 37 arranged along either side of the package to seal the end folds 34 on both sides of the package. Each sealing apparatus 37 has portions which act to hold the end flaps 35 in place, to join the flaps to one another by spot-welding, to make the spot-welded end flaps molten, and to cool and set the molten end flaps into the finished end fold seal.

Figure 4:
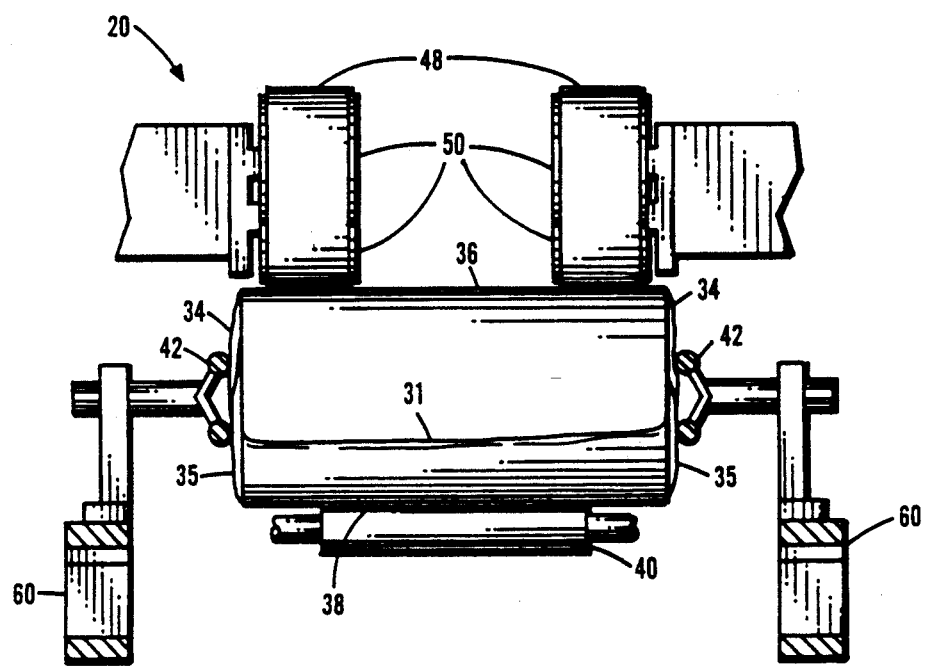
FIG. 4 is a cross sectional view of the package end fold sealer of FIG. 2 taken along section line 4—4 showing the end fold guides of the apparatus.

End fold guides 42 abut the unsealed end folds 34 as the package 36 is taken away from the overwrapper 22 on the transition belt 38 and hold the end folds 34 in place while the package 36 is moved along the transition belt 38 as shown in FIG. 4. The end fold guides 42 are pairs of generally straight rods located on either side of and parallel to the transition belt 38 which are slightly flaired outwardly where the transition belt takes away packages 36 from the overwrapper 22 as shown in FIG. 2.

The packages 36 are conveyed on the transition belt 38 to the bottom transport belt 44. The bottom transport belt 44 is driven by the pulleys 46 and moves at a slower speed than the transition belt 38. Once the package has been transferred to the bottom transport belt 44, it comes in contact with the upper transport belts 48 which are spaced vertically from the bottom transport belt and are substantially parallel to it. The upper transport belts 48 are driven by the pulleys 50 and move at substantially the same speed as the bottom transport belt 44. The speed of the bottom and top transport belts 44, 48 is adjusted to accomodate the output speed of the overwrapping machine 22. The bottom and top transport belts 44, 48 are spaced from one another to captivate the package 36 under nominal pressure. The belts 40, 44, and 48 have conventional support plates which for clarity are not shown.

Figure 5:
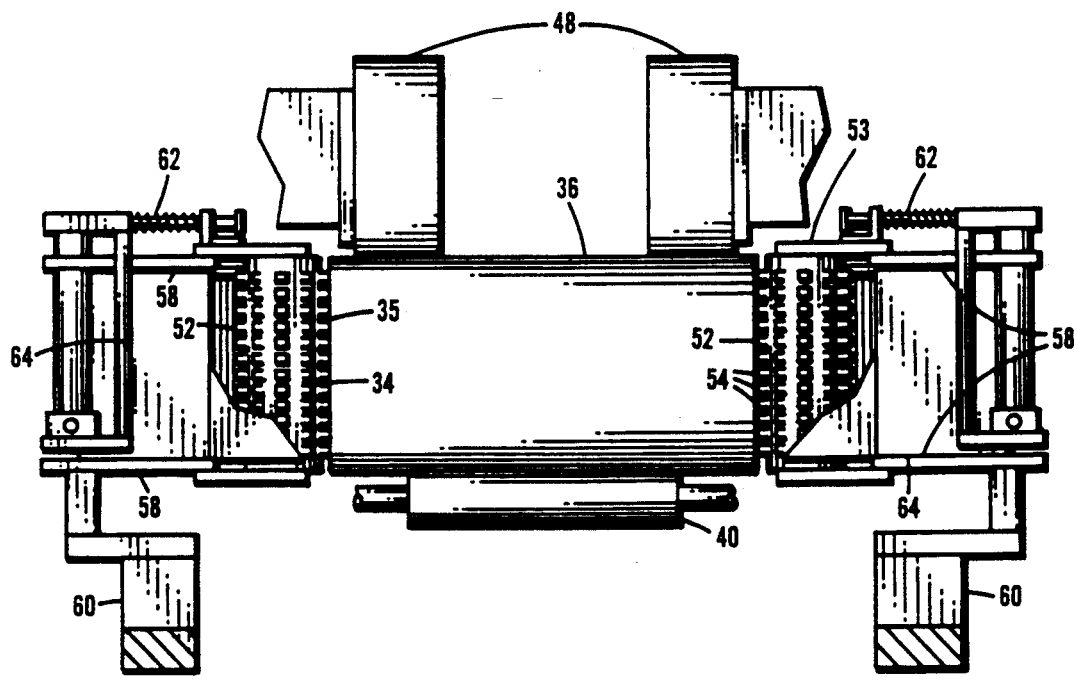
FIG. 5 is a cross sectional view of the apparatus of FIG. 2 taken along section line 5—5 with portions of the dispersing nozzles broken away to show the spot-weld rollers of the apparatus.

The transport belts 44, 48 move the package 36 beyond the ends of the end fold guides 42 where the unsealed package end folds 34 make contact with the spot-weld rollers 52 as shown in FIG. 5. The spot-weld rollers 52 are preferably cylinders formed of 2-inch diameter tubing with walls 0.25 inches thick. The surface of each roller 52 is preferably covered with a plurality of evenly spaced protrusions 54 which run the full length of the roller so each package end fold may be spot-welded along its full height. The shape of the protusions 54 may be any effective shape; for example, spot-like or oblong, or extended horizontal or vertical lines, but have been found to be effective in obtaining the necessary spot-welding if they are squares 0.125 inches on a side. The protusions 54 should not be so small as to puncture the plastic film forming the end folds and should not overheat and burn through the plastic film. The rollers 52 have a hard baked-on non-stick coating to insure proper release, long wear and to prevent transfer of molten plastic film from the end folds 34 to the rollers 52.

Two spot-welded rollers 52 are mounted on a vertical axis as best shown in FIG. 2 on each sealing apparatus 37 on either side of the transport belts 44, 48. The spot-weld rollers 52 are mounted together on a spot-weld roller support 53 with high ambient temperature radial bearings 56 which provide for low friction rotation of the rollers 52 within the support 53. The support 53 is pivotally mounted on radial bearings 59 on the ends of two vertically spaced pivot arms 58 which are rotatably mounted to the frame 60 of each sealing apparatus 37. Compression springs 62 are attached between the support 53 and the frame 60. These compression springs 62 serve to press the spot-weld rollers 52 against the end folds 34 of the packages 36 which move along the transport belts 44, 48. Thus, the spot-weld rollers will remain in rolling contact with the end folds 34 of the packages 36 regardless of the length of the package. Furthermore, if a particular package is of variable length, as is the case in a multiple roll package containing rolls cut at different lengths, the spot-weld rolls 52 will be consistently pressed against the end folds, resulting in evenly spot-welded flaps 35 of each end fold 34.

The spot-weld rollers 52 are partially enclosed by a hot air dispersing nozzle 64 which is joined by a telescoping tube 66 to a hot air generating unit 68. The hot air generating unit 68 is self-regulating and provides a constant volume of hot air at a constant temperature while the package end sealer 20 is in operation. The temperature of the hot air will generally be 400°-500° F. Fixed vanes 72 are located within the hot air dispersing nozzle 64 dividing it into three separate chambers--a spot-weld roller chamber 69 which directs air exclusively to the spot-weld rollers 52, and two nozzle chambers 70, 71 which direct air to the nozzle front face plate 74. Adjustable vanes 73 are tack-welded to the fixed vanes 72 within the nozzle 64 and may be used in initially setting the proportion of air from the hot air generating unit 68 directed towards either the spot-weld rollers 52 or the front face plate 74 of the dispersing nozzle 64 described more fully below.

The spot-weld rollers are uniformly heated by the hot air directed through the chamber 69 of the hot air dispersing nozzle 64 by the hot air generating unit 68. The pivot arms 58 are spaced above and below the nozzle 64 and the spot-weld rollers 52 fit within a cut-out 75 that generally conforms to the shape of the spot-weld rollers. When the unsealed end folds 34 of the package 36 are brought into compressive contact with the rollers 52 by the transport belts 44, 48 the heated protrusions 54 of the rollers 52 press against the end folds 34 as the rollers rotate on the bearings 56. Each heated protrusion 54 instantaneously bonds the multiple end flaps 35 of each end fold 34 to one another forming a spot-weld which is a small bond of the layered plastic film. Hundreds of these small areas of bonded plastic are formed by each spot-weld roller. These heat-sealed bonds hold the end folds in place against the package. The plastic film is not liable to stick to the spot-weld rollers because any particular protrusion 54 on a roller 52 has a hard baked-on non-stick coating and is never held continuously against the heated plastic but rotates rapidly away from the package end folds 34.

Figure 6:
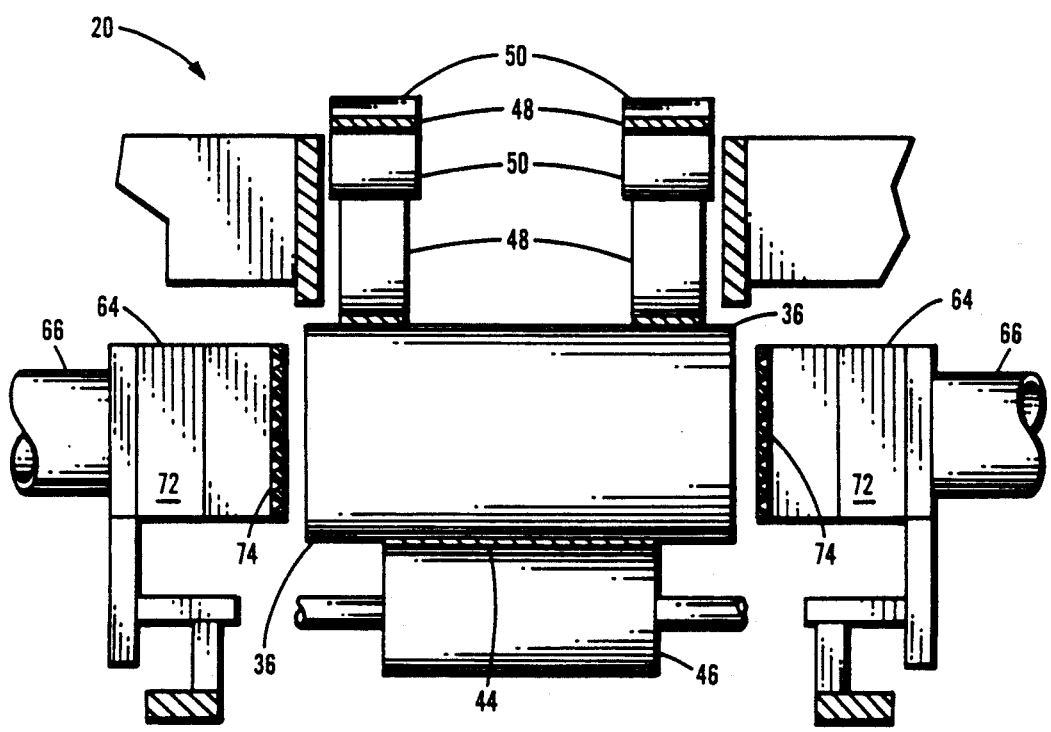
FIG. 6 is a cross sectional view of the apparatus of FIG. 2 taken along section line 6—6 showing the hot air dispersing nozzles of the apparatus.
Figure 7:
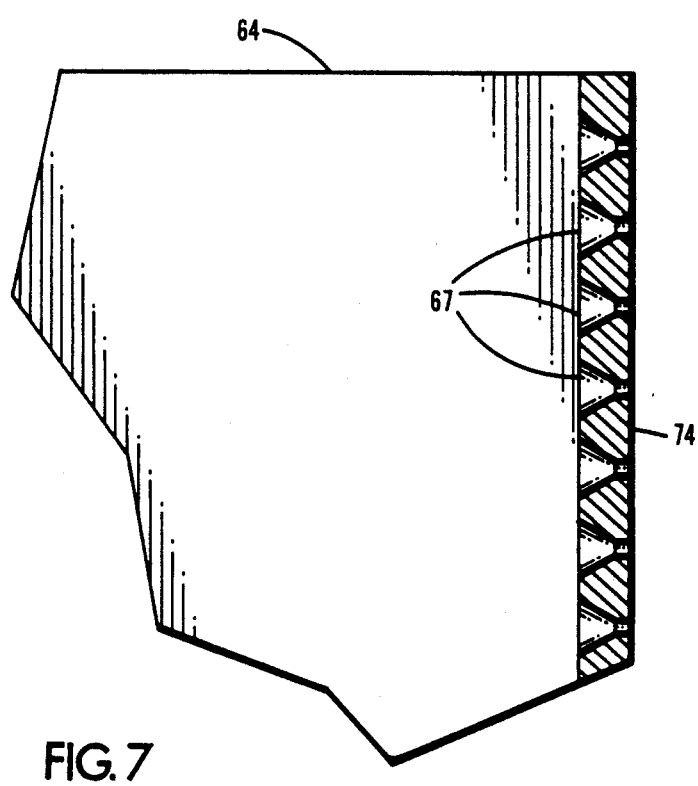
FIG. 7 is an enlarged fragmentary cross sectional view of the face plate of the hot air dispersing nozzle of the apparatus of FIG. 6.

The package 36 with the end flaps 35 of each end fold 34 held in place by spot-welded bonds is conveyed by the transport belts 44, 48 so that the end folds 34 are spaced from the front face plate 74 of the hot-air dispersing nozzle 64 as shown in FIG. 6. The front face plate 74 has a pattern of holes 67 approximately 0.125 inches in diameter evenly spaced across it. The holes 67 provide a cushion of hot air directed against the spot-welded end flaps 35. The holes 67 may be of constant cross-section but are preferably tapered towards the surface of the front face plate facing the transport belts 44, 48, as shown in FIG. 7, to more consistently direct or funnel the heated air. The fixed vanes 72 divide the hot air dispersing nozzle 64 so that the two separate nozzle chambers 70, 71 direct heated air blown by the hot air generating unit 68 to provide even temperature and air flow over the full length of the front face plate 74 of the nozzle. The adjustable vanes 73 may be positioned to adjust the amount of heated air from the hot air generating unit 68 that reaches each of the two sections of the front face plate 74. The hot air leaving the dispersing nozzle 64 causes the plastic film of the end folds 34 to become molten.

Figure 8:
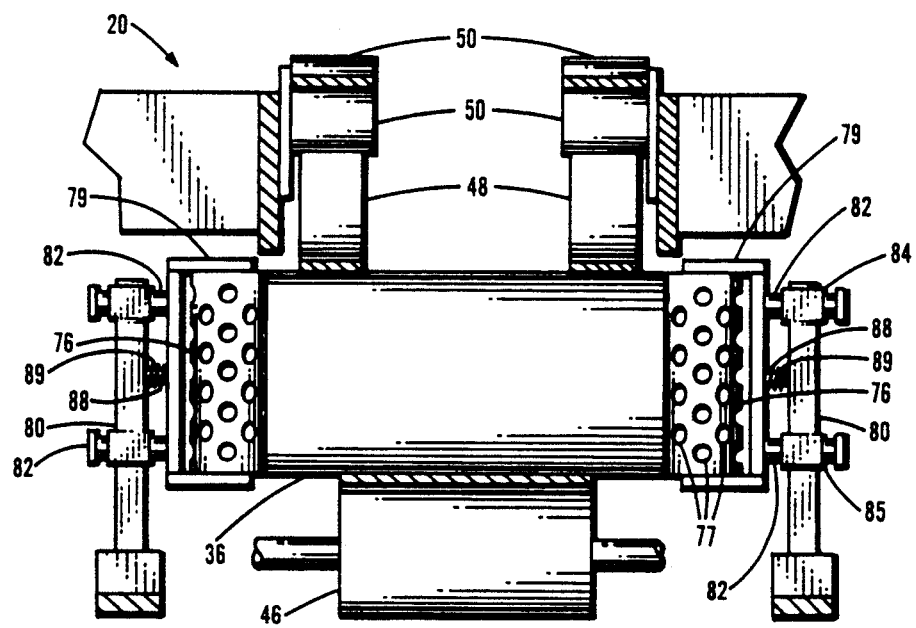
FIG. 8 is a cross sectional view of the apparatus of FIG. 2 taken along section line 8—8 and showing the compression rollers of the invention.

The transport belts 44, 48 convey the package 36 with molten end folds 34 into contact with a series of compression rollers 76 as shown in FIG. 8. Each compression roller 76 is preferably formed of 2-inch diameter tubing with a 0.25 inch thick wall. Quarter-inch diameter holes 77 are equally spaced horizontally and vertically in the compression rollers. The holes 77 facilitate convection heat transfer away from the packages. The compression rollers 76 are coated with a baked-on non-stick hard coating for proper release, increased wear life, and to prevent transfer of molten plastic film from the end folds 34 to the faces of the rollers 76.

Figure 9:
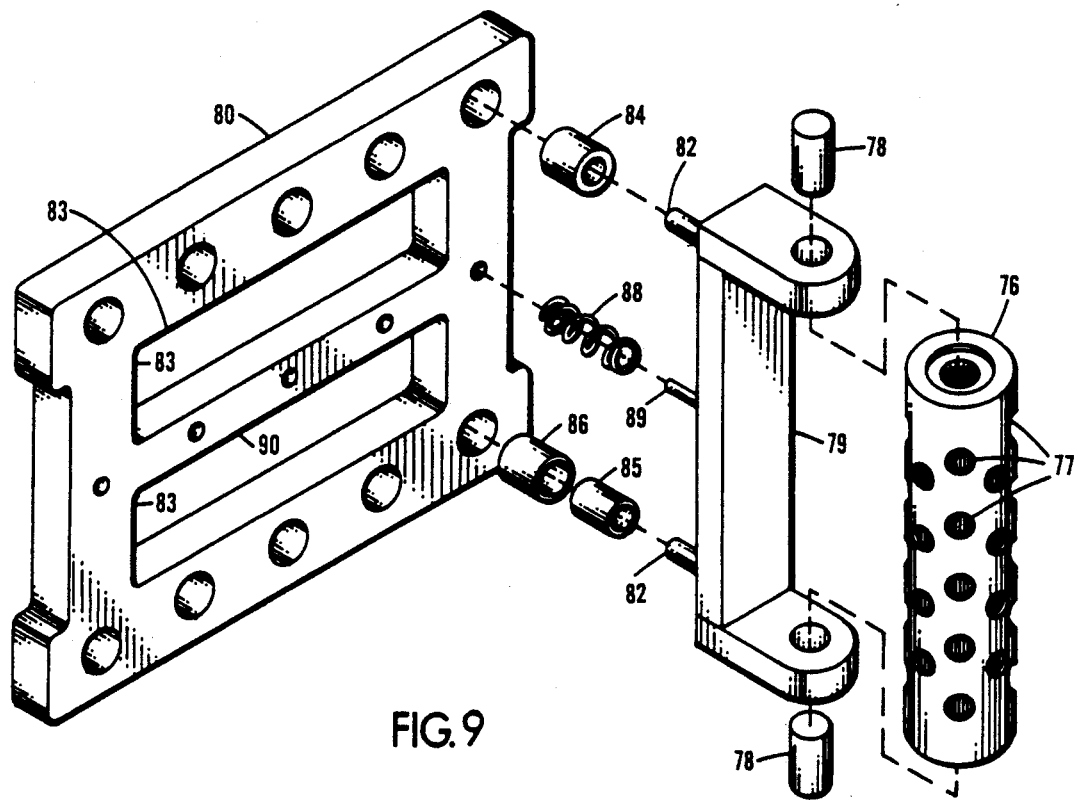
FIG. 9 is an exploded isometric view of a single compression roller and support arm mounted to the mounting frame of the package end fold sealer of this invention.

Five compression rollers 76 are rotatably mounted on either side of the transport belts 44, 48, on their vertical axes on radial bearings 78 within support arms 79. The bearings 78 permit the compression rollers to turn freely as the packages are moved along the transport belts 44, 48. As shown in FIG. 9, each support arm 79 with its compression roller 76 is attached to a mounting frame 80 by two shafts 82 extending from the support arm and supported by low friction linear ball bearings 84, 85 to permit easy in-and-out movement of the shafts 82. The top linear bearing 84 is fitted in a precision bored hole and the bottom linear bearing 85 is fitted with a hard rubber cushion 86 in a precision bored hole. This arrangement facilitates a slight vertical deviation for a biased-cut packaged article. The mounting frame 80 has openings 83 to allow air circulation away from the compression rollers 76. Generally, natural convection will be sufficient to keep the rollers within a desired temperature range. Compression springs 88 are provided on studs 89 which project from the support arms 79 and are received in holes in a horizontal bar 90 in the mounting frame 80. The springs are of different compression strength and hold the compression rollers 76 against the end folds 34 of the package 36. As each compression roller is separately mounted, the proper pressure is maintained on packages of even or uneven length.

If the compression rollers 76 strike the molten plastic too hard there will be a tendency to peel the molten plastic off the end folds. The support arms 79 supporting the first two compression rollers to contact the package with molten end folds are mounted on the mounting frame 80 with springs 88 of less compressive strength than those applying a compressive force to the last three compression rollers 76. Thus the first two rollers 76 contact the end folds with a relatively low pressure so as not to severely disturb the molten plastic of the end folds. The first two compression rollers 76 gently pressure weld together the molten plastic film of the end flaps 35 and begin to cool the package end folds 34. The final three compression rollers 76 are pressed more firmly against the package by stronger compression springs. As the molten plastic film has begun to set when it contacts the final compression rollers, the final rollers continue the process of pressure welding and cooling the molten plastic until the seal has taken set. When the package leaves the end fold sealer 20 at the discharge end 91, the package 36 is fully sealed. Once discharged, the packages may be conveyed to a final packing and shipping apparatus (not shown).

Each of the two sealing apparatuses 37, consisting of end fold guides 43, spot-weld rollers 52, heat dispersing nozzle 64, and compression rollers 76 is mounted on the frame 60 which is mounted on two threaded screws 94 located on either end of the package end fold sealer 20. The package end fold sealer 20 may be adjusted to accommodate packages of different lengths by moving the sealing apparatuses closer or farther away from the bottom transport belts 44. The telescoping tubes 66 will retain the hot air generating units 68 connected to the nozzles 64 when the sealing apparatuses 37 are moved in and out.

To adjust for packages of different height, the end fold sealer 20 may be equipped with a conventional system of chains and gears to elevate or lower the top transport belt 48 to provide a greater or lesser clearance between the bottom transport belt 44 and the top transport belt 48.

The size and number of spot-weld rollers and compression rollers may be varied from those of the preferred embodiment to accommodate different size packages or packaging rates. Furthermore, any appropriate means of transporting the packages through the end fold sealer may be used in place of belts, for example rollers or over-head grippers.

Greater rates of package transport through the package end fold sealer 20 will result in the package being exposed to each roller for a shorter period of time. In some instances to accommodate higher rates it may be necessary to increase the number of rollers or the width of the hot air dispersing nozzle. It may also be necessary to adjust the temperature or volume of heated air emitted by the hot air generating unit.

It should also be noted that a single blower may be used to supply air to the hot air dispersing nozzles of both sealing apparatuses 37 of the package end fold sealer 20 with dispersed heating elements. Alternatively, multiple hot air generators may be provided to separately supply hot air to the spot-weld rollers and the hot air dispersing nozzles.

As the sealing characteristics of the polyethylene plastic film will occassionally vary from batch to batch the end fold package sealer 20 may be adapted to the different sealing characteristics of the plastic by adjusting the heat and volume of heated air generated by the hot air blower and by adjusting the tension on the various rollers.

The package end fold sealer 20 of this invention is not limited to roll packages but may be utilized in sealing of end folds of packages with a variety of shapes such as packages for stacks of napkins. Other folds than mechanical end folds can be accommodated as well. Any end fold which presents a generally planar surface, such as double-point end folds or end-fold-underwraps can be properly sealed.

It is understood that the invention is not confined to the particular construction and arrangement of parts herein illustrated and described, but embraces such modified forms thereof as come within the scope of the following claims.

What is claimed is:

1. An apparatus for sealing the folded end flaps of a plastic film package, comprising:
    a) means for transporting the package along a path;
    b) air heating and blowing means;
    c) a rotatable air-heated cylindrical spot-weld roller having a plurality of spaced surface protrusions for heating and tacking limited areas of the plastic flaps, rotatably mounted in spring-loaded relation to the path such that the end flaps of a package moving on the path will be pressed against the protrusions of the cylinders and spot-welded to one another at spaced locations;
    d) means for blowing hot air against the spot-weld roller;
    e) means for directing the heated air from the air heating and blowing means onto the exposed spot-welded end flaps of a package traveling along the path to cause portions of the end flaps to become molten, wherein the air directing means is located along the path subsequent to the spot-weld roller; and
    f) a cylindrical compression roller rotatably mounted and maintained in spring-mounted relation to the path subsequent to the air-direction means such that the molten end flap portions of a package moving along the path will be pressed against and cooled by the compression roller to seal the end flaps to one another.

2. The apparatus of claim 1 wherein the package transporting means comprises a first moving belt and a second moving belt, wherein the first belt is adapted to receive packages from an overwrapping apparatus and transport them to the second belt moving at a reduced speed, and wherein the first belt and the second belt move along the path.

3. The apparatus of claim 1 further comprising linear spaced end fold guides spaced from the path so as to retain the end flaps of a package folded adjacent to the package traveling along the path in advance of the spot-weld cylinder.

4. The apparatus of claim 1 wherein the heated air directing means comprises a duct connected to the air heating and blowing means with at least one fixed vane dividing the duct into a compartment directing air to the spot-weld roller, and a compartment directing air to the spot-welded end folds of a package moving along the path, and at least one adjustable vane mounted in the duct for adjusting the quantity of air directed to each compartment of the duct.

5. The apparatus of claim 1 wherein the compression roller comprise tubular cylinders having portions defining a plurality of evenly spaced surface openings.

6. The apparatus of claim 1 wherein the heated air directing means comprises a duct connected to the air heating and blowing means with a face plate attached to the duct, wherein the face plate has portions defining a plurality of holes which are tapered towards the path to direct the air onto the end folds of a package moving along the path.

7. The apparatus of claim 1 wherein the spot-weld roller surface protrusions are in the form of small raised square evenly spaced over the entire surface of the roller.

8. The apparatus of claim 1 wherein the surface protrusions of the spot-weld roller are coated with a hard, non-stick coating to facilitate release of spot-welded package end flaps from the spot-weld rollers.

9. An apparatus for sealing the folded end flaps of a plastic film package, comprising:
   a) means for transporting the package along a path;
   b) air heating and blowing means;
   c) a rotatable air-heated cylindrical spot-weld roller having a plurality of spaces surface protrusions for heating and sealing limited areas of the plastic flaps, rotatably mounted in spring-loaded relation to the path such that the end flaps of a package moving on the path will be pressed against the protrusions of the cylinders and spot-welded to one another at spaced locations;
   d) a duct located along the path subsequent to the spot-weld roller, and connected to the air heating and blowing means with at least one fixed vane dividing the duct into a compartment directing heated air to the spot-weld roller, and a compartment directing heated air to the spot-welded end flaps of a package moving along the path to cause portions of the end flaps to become molten, and at least one adjustable vane mounted in the duct for adjusting the quantity of air directed to each compartment of the duct;
   e) a plate affixed to the duct, the plate having portion defining a plurality of evenly spaced holes located wherein to evenly disperse the heated air into the end flaps of a package moving along the path; and
   f) a cylindrical compression roller rotatably mounted and maintained in spring-mounted relation to the path subsequent to the air-directing means such that the molten end flap portions of a package moving along the path will be pressed against and cooled by the compression roller to seal the end flaps to one another.

10. An apparatus for sealing the folded end flaps of a plastic film package, comprising:
   a) means for transporting the package along a path;
   b) air heating and blowing means;
   c) a rotatable air-heated cylindrical spot-weld roller having a plurality of spaced surface protrusions for heating and sealing limited areas of the plastic flaps, rotatably mounted in spring-loaded relation to the path such that the end flaps of a package moving on the path will be pressed against the protrusion of the cylinders and spot-welded to one another at spaced locations;
   d) means for directing the heated air from the air heating and blowing means onto the spot-welded end flaps of a package traveling along the path to cause portions of the end flaps to become molten, wherein the air directing means is located along the path subsequent to the spot-weld roller; and
   e) at least two compression rollers rotatably mounted and maintained in spring-mounted relation to the path and located along the path subsequent to the heated air directing means, wherein the compressive force applied by the first roller to the molten portions of the end flaps of the package traveling along the path is less then the compressive force applied by the second compression roller, such that the molten end flap portions of a package moving along the path will be pressed against and cooled by the compression rollers to seal the end flaps to one another.

11. An apparatus for sealing the folded end flaps of a plastic film wrapped package, comprising:
   a) means for transporting the package along a path;
   b) air heating and blowing means;
   c) a duct with a face plate connected to the air heating and blowing means, the face plate having portions defining a plurality of holes for directing the heated air onto the folded end flaps of a package moving along the path to cause portions of the end flaps of the package to become molten; and
   d) first and second tubular cylindrical rotatable compression rollers having portions defining a plurality of holes in the compression rollers to facilitate cooling of the rollers and package end flaps, and the rollers are located along the path subsequent to the duct, each compression roller being separately spring mounted along the path such that the molten end flap portions of a package moving along the path will be pressed against each compression roller in series to cool and set the end flaps of the package to seal the end flaps to one another, wherein the compressive force applied by the first compression roller to the molten portions of the end flaps of the package traveling along the path is less than the compressive force applied by the second compression roller.

12. The apparatus of claim 11 wherein the compression rollers are coated with a hard non-stick coating to facilitate release of sealed packages from contact with the compression rollers.

* * * * *

UNITED STATES PATENT AND TRADEMARK OFFICE
CERTIFICATE OF CORRECTION

PATENT NO. : 5,058,361
DATED : October 22, 1991
INVENTOR(S) : Schumacher

It is certified that error appears in the above-identified patent and that said Letters Patent is hereby corrected as shown below: Title Page:

Items [19] and [75]  "Schmacher" should be -- Schumacher --.

Col. 1, line 12,  "Products" should be -- products --.

Col. 1, line 32,  "Packaged" should be -- packaged --.

Col. 3, line 42,  delete the comma before "rollers".

Col. 8, line 36,  "air-direction" should be -- air-directing --.

Col. 8, line 63,  "roller" should be -- rollers --.

Col. 9, line 6,  "square" should be -- squares --.

Col. 9, line 17,  "spaces" should be -- spaced --.

Col. 9, line 35,  "portion" should be -- portions --.

Col. 9, line 37,  "wherein" should be -- therein --.

Col. 10, line 2,  "protrusion" should be -- protrusions --.

UNITED STATES PATENT AND TRADEMARK OFFICE
CERTIFICATE OF CORRECTION

PATENT NO. : 5,058,361

DATED : October 22, 1991

INVENTOR(S) : Schumacher

It is certified that error appears in the above-identified patent and that said Letters Patent is hereby corrected as shown below:

Col. 10, line 17, "then" should be --than--.

Signed and Sealed this

Twenty-third Day of March, 1993

*Attest:*

STEPHEN G. KUNIN

*Attesting Officer*     Acting Commissioner of Patents and Trademarks